United States Patent Office 2,705,727
Patented Apr. 5, 1955

2,705,727

SYNTHESIS OF UREAS

Peter Joseph Graham, Kennett Square, Pa., assignor to E. I. du Pont de Nemours and Company, Wilmington, Del., a corporation of Delaware No Drawing. Application July 10, 1952,
Serial No. 298,171

11 Claims. (Cl. 260—553)

This invention relates to the synthesis of ureas and, more particularly, to a process of synthesizing water-soluble ureas.

Heretofore ureas have been prepared by several methods but the preparation and, especially, the purification of water-soluble ureas has remained a difficult operation. For example, hydroxyurea has been prepared by reaction of calcium cyanate with hydroxylamine nitrate in absolute ethanol or by the reaction of potassium cyanate and hydroxylamine hydrochloride in aqueous solution. In either case, products of the reaction are water-soluble and considerable difficulty has been encountered in purification of the desired reaction product. Ureas which contain further functions such as in hydroxyurea, are sensitive to elevated temperature and to various hydrolytic conditions so that standard methods of preparation and purification result in decomposition of such ureas. A further problem has been the development of procedures to obtain high yields of ureas by the reaction of an amino alcohol with a cyanate without reaction of the alcoholic hydroxyl, i. e., with suppression of the urethane-forming reaction.

An object of the present invention is to provide an improved process of synthesizing ureas, particularly water-soluble ureas. A further object is to provide such a process wherein the difficulties heretofore encountered in the purification of the synthesized urea are avoided. A still further object is to provide such a process which is readily carried out and is economical to operate. Other objects will be apparent from the description of the invention given hereinafter.

The above objects are accomplished according to the present invention by intimately contacting an aqueous solution of an acid salt of a compound having hydrogen directly attached to nitrogen and in which acid salt the acid has a pKa of not more than 4.7, with a synthetic polymeric water-insoluble quaternary ammonium cyanate anion exchange resin, whereby the urea corresponding to the acid salt used is obtained.

It has now been discovered that water-soluble ureas may be readily prepared by bringing into intimate contact with a quaternary ammonium anion exchange resin which has been converted to the cyanate form, a solution of an acid salt of an N-H compound, such as a primary or secondary amine hydrochloride, and that the product thus obtained is free from contaminants since the anionic portion of the basic nitrogen salt is retained by the insoluble quaternary resin. Further, the process is also adapted to preparation of ureas of low water solubility merely by the addition of a water-miscible solvent such as alcohol or dioxane to the aqueous solution of the acid salt.

In carrying out the process it is only necessary to contact the aqueous salt solution intimately with the quaternary resin employed in any form whereby a large surface is available for reaction, at a relatively low temperature. Quaternary ammonium anion exchange resins are normally available in granular form, not dissimilar to grains of sand, and in such form as highly adapted for use in this invention.

The procedure may be illustrated by the following equations relating to the preparation of hydroxyurea from hydroxylamine hydrochloride:

(I) 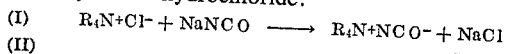

(II) 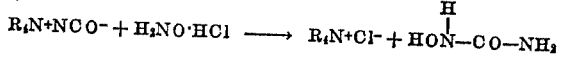

Equation I shows the simple conversion of a quaternary ammonium anion exchange resin from the chloride form to the cyanate form. Equation II shows the reaction of the resin in the cyanate form with hydroxylamine hydrochloride whereby hydroxyurea is formed and the anion Cl⁻ is retained by the quaternary resin.

The following examples in which all proportions are by weight unless otherwise stated, illustrate the preparation of specific ureas in accordance with the present invention.

EXAMPLE I

A 90 x 6 cm. column was packed with 2 kg. of granular "Amberlite" IRA–410 resin in the chloride form (a vinylpyridine/divinylbenzene copolymer quaternized with dimethyl sulfate and converted to chloride) and washed with 3 kg. of a 10% aqueous solution of sodium cyanate. This changed the resin from the chloride to the cyanate form. Sodium chloride and excess sodium cyanate were then washed from the column with distilled water until the effluent failed to give a white precipitate with silver nitrate. The reaction of Equation II was conducted by elutriating the column with a solution of 105 g. (1.5 mole) of hydroxylamine hydrochloride in 400 ml. water at about 15° C. A hot (50–70° C.) reaction zone developed near the top of the column and about thirty minutes was required for this hot zone to descend the full length of the column. The reaction solution was followed in the column by 2.5 l. of distilled water. Collection of the product was begun when hydroxyurea could be detected in the effluent, as indicated by a black precipitate on warming a sample with a silver nitrate test solution. All the effluents were combined and vacuum evaporated at 35° C. to give 90 g. of tan residue corresponding to 79% yield of crude product. After recrystallization from 100 ml. of water heated to 75° C., the colorless product was dried in a vacuum desiccator over phosphorus pentoxide to give 60.6 g. (53% yield) of hydroxyurea, M. P. 133–136° C.

EXAMPLE II

*Preparation of N,N-diethylurea*

A solution of diethylamine hydrochloride was prepared by treating 109.5 g. (1.5 moles) of diethylamine in 250 ml. of distilled water cooled to 12° C. with a solution of 124.5 ml. of concentrated hydrochloric acid in 150 ml. of distilled water cooled to 12° C. The resulting solution was passed through the column as described in Example I. Evaporation of the effluent gave 164 g. (94% yield) of crude N,N-diethylurea, M. P. 46–60° C., from which the pure compound was obtained by crystallization from chloroform.

EXAMPLE III

*Preparation of n-butylurea*

The procedure of Example II was repeated except that n-butylamine was employed in place of the diethylamine. Evaporation of the effluent gave 157.5 g. (90%) of crude n-butylurea (M. P. 68–85° C.) from which the pure compound was obtained by crystallization from ethyl acetate.

EXAMPLE IV

*Preparation of β-hydroxyethylurea*

The procedure of Example II was repeated except that 91.5 g. of ethanolamine was employed in place of the diethylamine. Evaporation of the effluent gave 151.5 g. (97% yield) of white solid, M. P. 60–74° C., consisting of crude β-hydroxyethylurea.

EXAMPLE V

*Preparation of 1,1'-ethylenediurea*

The procedure of Example II was repeated except that 45 g. (0.75 mole) of ethylenediamine was used in place of the diethylamine. Evaporation of the aqueous effluent gave three crops of crystals, the first of 56.6 g., M. P. 189.5–190° C. (compared to the literature value of 192° C.), the second of 13.7 g., M. P. 187–189° C., and 23.1 g. of crude product. The total yield was 85% of theoretical for 1,1'-ethylenediurea.

EXAMPLE VI

Preparation of 1,1'-ethylenediurea

The procedure of Example I was repeated except that 45 g. (0.75 mole) of ethylenediamine in 250 ml. of water was mixed with 45 g. (0.75 mole) of acetic acid in 250 ml. of water and employed in place of the hydroxylamine hydrochloride. This solution was cooled to 30° C. and passed through the anion exchange column having cyanate anions. The effluent was evaporated under vacuum at 30–35° C. to a volume of 300 ml. On cooling, a 17.4% yield of crystalline 1,1'-ethylenediurea was obtained.

It will be understood that the above examples are merely illustrative and that the invention broadly comprises the preparation of ureas by intimately contacting an aqueous solution of an acid salt of a compound having hydrogen directly attached to nitrogen and in which acid salt the acid has a pKa of not more than 4.7, with a synthetic polymeric water-insoluble quaternary ammonium cyanate anion exchange resin.

Any synthetic water-insoluble quaternary ammonium cyanate anion exchange resin can be used in carrying out the process of this invention. The cation portion of these resins is of high molecular weight and is water-insoluble. A description of these synthetic anion exchange resins is given in "Ion Exchange Resins," by Kunin and Myers (Wiley and Sons, N. Y., 1950), pages 38–59. Typical commercially available anion exchange resins suitable for use in this invention are "Dowex" 2 (see Ind. Eng. Chem. 40, 1350 (1948)), "Dowex" 1, "Amberlite" IRA–400, and "Amberlite" IRA–410. These resins themselves are basic but are generally employed as a quaternary salt with various anions. For example, a useful ion exchange resin can be prepared by copolymerization of vinylpyridine with divinylbenzene. The resulting basic insoluble resin forms quaternary salts with suitable quaternizing agents such as dimethyl sulfate. The anion is subject to change, e. g., by treatment with excess chloride ion which converts the resin to the chloride form. Similarly, the anion can be exchanged for cyanate ion by treatment of the resin with a water-soluble inorganic cyanate salt in aqueous solution. There is thus obtained a synthetic polymeric water-insoluble quaternary ammonium cyanate anion exchange resin.

The quaternary ammonium cyanate resin will react with a soluble salt of a nitrogen compound which contains a hydrogen directly attached to nitrogen and which NH group is reactive with an acid which has a pKa of not more than 4.7, to form a water-soluble salt. The pKa is a logarithmic index defining the acid strength and is further explained in "The Theory of Organic Chemistry" by Branch and Calvin (Prentice-Hall, New York, 1941), pages 183–270.

Among the nitrogen compounds adapted for use in this invention are ammonia, hydroxylamine, hydrazine, methylamine, dimethylamine, aniline, ethanolamine, glycine, hexamethylenediamine, ethyleneimine, piperidine, piperazine, morpholine, benzylamine, m-phenylenediamine, 2-chloroethylamine, bis(2-cyanoethyl)amine, bis-(2-hydroxyethyl)amine, α-aminonitriles, guanidine, melamine, aminopyrimidines, semicarbazides, isoxazoles, pyrazolines, aminoketones, purine, pyrrole, imidazole, 5-aminobarbituric acid, glycylglycine, and 2-aminopyridine.

The only requirement of the N-H containing compound for the purpose of this invention is that it forms a water-soluble salt by reaction of the NH group with an acid that is at least as strong as acetic acid. Weak acids are not as apt to form water-soluble salts nor are the salts obtained sufficiently reactive with the polyquaternary ammonium cyanate to give the desired urea in the reaction. Preferred are the primary and secondary monoamines.

The acids employed to form salts with the NH compound are those that have sufficient strength to free cyanic acid from the polyquaternary ammonium cyanate. These include acetic, chloroacetic, dichloroacetic, hydrobromic, sulfuric, and phosphoric. The useful acids are those that have a pKa of 4.7 or less and, preferably, those that have a pKa of less than 2.8. The preferred acids are those that are water-miscible in all proportions. Particularly useful are the hydrogen halides and of these hydrobromic and hydrochloric acids are cheap, readily available and of sufficient strength.

In the reaction of the synthetic organic anion exchange resin in the form of polyquaternary ammonium cyanate, the resin is water insoluble. The resin is employed in a form whereby as large a surface is available for reaction as practical. Preferably, this is in granular or spherical form coarse enough to permit aqueous solutions to pass through a column or container filled with the resin. Suitable containers are glass columns or cylindrical vessels.

In carrying out the process of this invention, the temperature of the polyquaternary ammonium cyanate and solution of salt of the basic nitrogen compound is generally maintained as low as convenient to minimize decomposition of reaction products which can occur at elevated temperatures. The temperature is not sharply critical but should be such as to maintain aqueous conditions. If desired, a temperature somewhat below 0° C. could be used and, at the upper extreme, unless there is danger of decomposition of the urea being formed, a temperature as high as 100° C. Temperatures of 0° C. to 80° C. are normally used, with temperatures of the order of 0° C. to 30° C. particularly preferred where ureas containing additional functional groups, such as carboxy, amino or alcoholic functions are present. As shown in Example I, the temperature of the reactants rose to 70° C. without harm.

In the process of this invention the proportion of reactants has no material bearing on the product formed inasmuch as the urea corresponding to the basic nitrogen compound employed will be formed in any event. However, in practical operation, it normally is quite advantageous to have present sufficient polyquaternary ammonium cyanate to react with all of the acid salt of the basic nitrogen compound in order that the urea may be obtained free from contaminants. Therefore, in using a packed column, aqueous solution of the acid salt usually will be added only until the resin granules at the bottom of the column (the last to be reacted) have been reacted.

The products of the process of this invention are generally water soluble. In cases where the product has low water solubility, aqueous solutions containing additional solvent such as alcohol or dioxane are employed. The products, e. g., the ureas, are isolated in any conventional manner from the aqueous solution, for example, by evaporation or extraction.

A particular advantage of this invention is that the product is obtained free from contaminants since the anionic portion of the basic nitrogen salt is retained by the insoluble quaternary resin.

As an example of the usefulness of this invention, hydroxyurea is made readily available because its synthesis and purification have heretofore been difficult. Potentially this product can be used as a rubber blowing agent, reducing agent in chemical reactions or as an intermediate. The process of this invention offers a means for the preparation of ureas containing further functional groups that can be employed in polymer preparation.

As many apparently widely different embodiments of this invention may be made without departing from the spirit and scope thereof, it is to be understood that the invention is not limited to the specific embodiments thereof except as defined in the appended claims.

The invention claimed is:

1. Process of synthesizing a urea which comprises intimately contacting an aqueous solution of an acid salt of a compound selected from the group consisting of ammonia, hydroxylamine, hydrazine and organic amines having hydrogen directly attached to nitrogen, and in which acid salt the acid has a pKa of not more than 4.7, with a synthetic polymeric water-insoluble quaternary ammonium anion exchange resin charged with cyanate ion, said acid being of sufficient strength to free the cyanate ion and being otherwise inert.

2. Process as set forth in claim 1 wherein said acid salt is one in which the acid has a pKa of not more than 2.8.

3. Process as set forth in claim 1 wherein said acid salt is an acid salt of a monoamine.

4. Process as set forth in claim 1 wherein said acid salt is one in which the acid is hydrochloric.

5. Process of synthesizing a urea which comprises passing an aqueous solution of an acid salt of a compound selected from the group consisting of ammonia, hydroxylamine, hydrazine and organic amines having hydrogen directly attached to nitrogen, and in which acid salt the acid has a pKa of not more than 4.7, through an elongated body composed of granular synthetic polymeric water-insoluble quaternary ammonium anion exchange resin charged with cyanate ion, said acid being of sufficient strength to free the cyanate ion and being otherwise inert.

6. Process as set forth in claim 5 wherein said acid salt is one in which the acid has a pKa of not more than 2.8.

7. Process of synthesizing hydroxyurea which comprises intimately contacting an aqueous solution of an acid salt of hydroxylamine in which acid salt the acid has a pKa of not more than 4.7, with a synthetic polymeric water-insoluble quaternary ammonium anion exchange resin charged with cyanate ion, said acid being of sufficient strength to free the cyanate ion and being otherwise inert.

8. Process as set forth in claim 7 wherein said acid salt is one in which the acid has a pKa of not more than 2.8.

9. Process as set forth in claim 7 wherein said acid salt is hydroxylamine hydrochloride.

10. Process of synthesizing hydroxyurea which comprises passing an aqueous solution of an acid salt of hydroxylamine in which acid salt the acid has a pKa of not more than 4.7, through an elongated body composed of granular synthetic polymeric water-insoluble quaternary ammonium anion exchange resin charged with cyanate ion, said acid being of sufficient strength to free the cyanate ion and being otherwise inert.

11. Process as set forth in claim 10 wherein said acid salt is hydroxylamine hydrochloride.

References Cited in the file of this patent

UNITED STATES PATENTS

| 1,241,920 | Bucker | Oct. 2, 1917 |
| 2,050,557 | Bockmuhl et al. | Aug. 11, 1936 |
| 2,203,504 | Piggott et al. | June 4, 1940 |
| 2,254,136 | Buck et al. | Aug. 26, 1941 |

FOREIGN PATENTS

| 5,025 | Netherlands | June 1, 1920 |
| 470,838 | Canada | Jan. 16, 1951 |

OTHER REFERENCES

Serial No. 383,040, Moldenhauer et al. (A. P. C.), published April 20, 1943.

Hantzsch: "Liebig's Annalen," vol. 299 (1898), p. 99.

Liebig: "Liebig's Annalen," vol. 38 (1841), pp. 108–109.